(12) United States Patent
Smith et al.

(10) Patent No.: US 10,009,359 B2
(45) Date of Patent: Jun. 26, 2018

(54) SYSTEM, APPARATUS AND METHOD FOR TRANSFERRING OWNERSHIP OF A DEVICE FROM MANUFACTURER TO USER USING AN EMBEDDED RESOURCE

(71) Applicant: Intel Corporation, Santa Clara, CA (US)

(72) Inventors: Ned M. Smith, Beaverton, OR (US); Nathan Heldt-Sheller, Portland, OR (US); Sachin Agrawal, Hillsboro, OR (US); Mats G. Agerstam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 14/865,198

(22) Filed: Sep. 25, 2015

(65) Prior Publication Data
US 2016/0366157 A1    Dec. 15, 2016

Related U.S. Application Data

(60) Provisional application No. 62/172,900, filed on Jun. 9, 2015.

(51) Int. Cl.
*H04L 29/06* (2006.01)

(52) U.S. Cl.
CPC .......... *H04L 63/1416* (2013.01); *H04L 63/06* (2013.01); *H04L 63/10* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2011/0185059 A1* | 7/2011 | Adnani | H04W 24/08 709/224 |
| 2013/0007442 A1 | 1/2013 | Mao et al. | |
| 2013/0100848 A1* | 4/2013 | Falk | H04L 43/028 370/252 |

(Continued)

OTHER PUBLICATIONS

Garcia-Morchon et al. "Security Considerations in the IP-based Internet of Things", Sep. 11, 2013, pp. 1-45.*

(Continued)

*Primary Examiner* — Joseph P Hirl
*Assistant Examiner* — Hassan Saadoun
(74) *Attorney, Agent, or Firm* — Trop, Pruner & Hu, P.C.

(57) ABSTRACT

In one embodiment, a method includes receiving, in an on-boarding system for a first network, a request to transfer ownership of a first device to a new owner; receiving, in the on-boarding system, notification information from a spectrum analyzer regarding wireless signal information within the first network; determining if a potential attacker is within a radio range of the first network based on the wireless signal information; responsive to determining that the potential attacker is within the radio range, manipulating a signal strength of the on-boarding system and the first device, to limit an emission range of the on-boarding system and the first device; and performing a native communication protocol to communicate ownership information, and to cause the first device to store the ownership information in a storage of the first device.

17 Claims, 12 Drawing Sheets

(56) References Cited

U.S. PATENT DOCUMENTS

| | | |
|---|---|---|
| 2015/0121066 A1 | 4/2015 | Nix |
| 2015/0134954 A1 | 5/2015 | Walley et al. |

OTHER PUBLICATIONS

Wikipedia, "OSI Model", https://en.wikipedia.org/wiki/OSI_model#Layer_4:_Transport_Layer, Jun. 8, 2015, 7 pages.

Wikipedia, "Key Management", https://en.wikipedia.org/wiki/Key_management, May 19, 2015, 5 pages.

Wikipedia, "Publish—Subscribe Pattern", https://en.wikipedia.org/wiki/Publish%E2%80%93subscribe_pattern, Mar. 18, 2015, 4 pages.

Wikipedia, "Data Distribution Service", https://en.wikipedia.org/wiki/Data_Distribution_Service, May 21, 2015, 5 pages.

Wikipedia, "Kerberos (Protocol)", https://en.wikipedia.org/wiki/Kerberos_%28protocol%29, May 7, 2015, 6 pages.

Stackexchange, "Cryptography", http://crypto.stackexchange.com/questions/3682/how-can-the-diffie-hellman-key-exchange-be-extended-to-three-parties, Aug. 30, 2012, 1 page.

Wikipedia, "XMPP", https://en.wikipedia.org/wiki/XMPP, May 22, 2015, 7 pages.

IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.

Hardjono, et al., "Fluffy: Simplified Key Exchange for Constrained Environments", draft-hardjono-ace-fluffy-00, Mar. 23, 2015, 24 pages, Intel Corporation.

openinterconnect.org, "Open Interconnect Consortium: An Overview to Connect Devices Everywhere", http://openinterconnect.org/wp-content/uploads/2015/07/Open-Interconnect-ConsortiumOverview_Final-.pdf, Jul. 2015, 7 pages.

openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.

openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.

openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.

U.S. Appl. No. 14/863,043, filed Sep. 23, 2015, entitled "System, Apparatus and Method for Group Key Distribution on for a Network" by Ned M. Smith.

U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.

U.S. Appl. No. 14/864,957, filed Sep. 25, 2015, entitled "System, Apparatus and Method for Managing Lifecycle of Secure Publish-Subscribe System" by Ned M. Smith, et al.

U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.

U.S. Appl. No. 14/865,191, filed Sep. 25, 2015, entitled "System, Apparatus and Method for Multi-Owner Transfer of Ownership of a Device" by Jesse Walker, et al.

U.S. Appl. No. 14/856,857, filed Sep. 17, 2015, entitled "System, Apparatus and Method for Access Control List Processing in a Constrained Environment" by Ned M. Smith, et al.

U.S. Appl. No. 14/859,572, filed Sep. 21, 2015, entitled "System, Apparatus and Method for Privacy Preserving Distributed Attestation for Devices" by Ned M. Smith, et al.

U.S. Appl. No. 14/863,496, filed Sep. 24, 2015, entitled "System, Apparatus and Method for Stateful Application of Control Data in a Device" by Nathan Heldt-Sheller, et al.

U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.

U.S. Appl. No. 15/045,676, filed Feb. 17, 2016, entitled "System, Apparatus and Method for Security Interoperability Path Analysis in an Internet of Things (IOT) Network" by Ned M. Smith, et al.

U.S. Appl. No. 62/172,962, filed Jun. 9, 2015, entitled "Providing Protected Content in an IoT Network" by Ned M. Smith, et al.

U.S. Appl. No. 14/968,125, filed Dec. 14, 2015, entitled "A Self-Configuring Key Management System for an Internet of Things Network" by Ned M. Smith.

U.S. Appl. No. 14/757,750, filed Dec. 23, 2015, entitled "System, Apparatus and Method for Optimizing Symmetric Key Cache Using Tickets Issued by a Certificate Status Check Service Provider" by Jed M. Smith, et al.

U.S. Appl. No. 14/976,165, filed Dec. 21, 2015, entitled "System, Apparatus and Method for Migrating a Device Having a Platform Group" by Ned M. Smith, et al.

U.S. Appl. No. 14/977,742, filed Dec. 22, 2015, entitled "System, Apparatus and Method for Safety State Management of Internet Things (IoT) Devices " by Ned M. Smith, et al.

Wikipedia, "Tor", https://en.wikipedia.org/wiki/Tor_%28anonymity_network%29, Jun. 4, 2015, 14 pages.

Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.

Garcia-Morchon, et al., 'Security Considerations in the IP-based Internet of Things', Sep. 11, 2013, pp. 1-45. [retrieved on Jul. 4, 2016]. Retrieved from the Internet: <URL: https://tools.ietf.org/pdf/draft-garcia-core-cecurity-06.pdf>. See pp. 6, 9-11, 18, 21.

International Searching Authority, "Notification of Transmittal of the International Search Report and the Written Opinion of the International Searching Authority," dated Aug. 8, 2016, in International application No. PCT/US2016/031795.

\* cited by examiner

SYSTEM, APPARATUS AND METHOD FOR TRANSFERRING OWNERSHIP OF A DEVICE FROM MANUFACTURER TO USER USING AN EMBEDDED RESOURCE

This application claims priority to U.S. Provisional Patent Application No. 62/172,900, filed on Jun. 9, 2015, in the names of Ned M. Smith, Nathan Heldt-Sheller, Sachin Agrawal, and Mats G. Agerstam, entitled SYSTEM, APPARATUS AND METHOD FOR TRANSFERRING OWNERSHIP OF A DEVICE FROM MANUFACTURER TO USER USING AN EMBEDDED RESOURCE, the disclosure of which is hereby incorporated by reference.

BACKGROUND

Establishing trust in an Internet of Things (IoT) device is a challenge facing the emerging Internet-of-Things networks because the added attack surface presented by IoT networks raises the probability that attackers may find ways to infiltrate and weaken or compromise both IoT as well as traditional cyber networks. Mechanisms for establishing trust range from add-on security monitoring applications that attempt to observe devices from within the device or over a network connection. Such observations are based in the philosophy that the observing components are not attackable by malware within the network. Still other approaches integrate trusted computing modules which can undesirably increase cost that make such approaches unfeasible.

DETAILED DESCRIPTION

Figure 1:
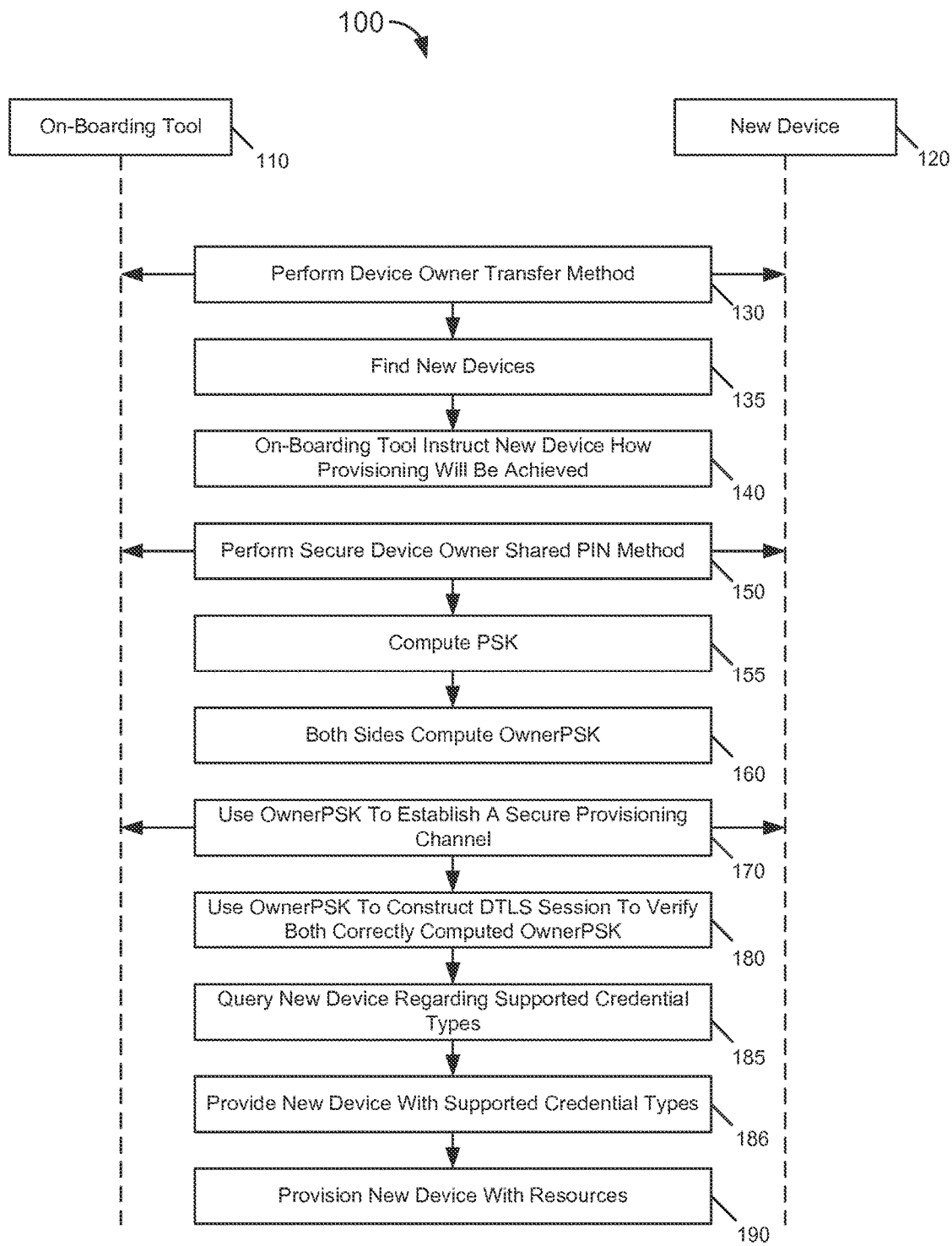
FIG. 1 is a diagram illustrating an on-boarding and owner transfer method, in accordance with an embodiment.

In various embodiments, an IoT device may be configured to be a trusted device. To this end, embodiments may re-factor trusted computing techniques to be applied to IoT devices directly, where the basis for trust is established by the device itself and the protocols for on-boarding the device into an IoT network. Embodiments may provide protocols for on-boarding IoT devices, where such devices may take advantage of trusted computing methods traditionally reserved for security coprocessors and other security augmentation technologies. Specifically, embodiments may securely transfer a device owner status established by a manufacturer to a device owner. Note that the term "on-boarding" refers to a process through which a device is introduced into an owner's environment. As part of overall on-boarding, a device may have securely transferred ownership from a previous owner or manufacturer to the intended owner. Owner transfer can be a point of attack since it may be difficult to detect this attack subsequently. In an embodiment, this on-boarding approach may reuse an IoT device resource model so that the infrastructure used to process normal IoT functions may also be used to perform secure on-boarding, which may be more efficient than defining separate security messaging, interfaces and data structures. In this way, IoT devices can achieve a higher level of trust than otherwise possible.

Embodiments provide a protocol and operational duties performed by a device manufacturer and user to establish a security context in which device owner transfer may occur. An IoT device may determine when appropriate conditions are met to declare when ownership is established. In contrast, traditional approaches assume devices are slaves to an authoritative service that declares the device is owned and trusted. Embodiments enable device developers to include device owner transfer logic in an IoT device so that the most authoritative assertion of device ownership is self-asserted.

In various embodiments, security relevant device on-boarding status is represented using a resource abstraction model used by IoT frameworks (e.g., Open Interconnect Consortium (OIC), OMA) to capture device ownership transfer state changes. This approach allows the framework to accurately maintain and represent to other devices its ownership status without having a sideband or security specific representation. Embodiments result in a set of device on-boarding flows expressed in the native device interaction scripting that implements the intended device owner transfer protocols without introducing a separate trusted protocol messaging stack and interface. Trust is established by orchestrating bootstrap sequences such that the device does not enter an insecure state during on-boarding. Embodiments may define explicit on-boarding sequences resulting in device owner transfer from a trusted manufacturer to the intended consumer/owner. Understand that while example embodiments herein relate to devices to communicate with protocols compatible with Open Interconnect Consortium arrangements, the general ownership transfer protocol described herein applies to many other IoT examples.

In embodiments, a pre-shared key, called the "OwnerPSK," may be established when the new device is introduced into an owner's network. The OwnerPSK (one per device) is the result of an out-of-band transfer of ownership method between the previous owner/manufacturer and the new owner (a device owner transfer method (DOXM)). Different embodiments herein may produce a pre-shared key value that is used to assert device ownership. The OwnerPSK is used to generate (e.g.,) symmetric keys that are used for other purposes. For example, a pair-wise PSK can be used to protect device-provisioning data from a system management tool. In one embodiment, the OwnerPSK generation method may be as follows, as an example. OwnerPSK=PRF(Random, DeviceLabel, NewOwnerLabel, PreviousOwnerLabel), where: PRF is a pseudo-random function used for key generation that cryptographically combines function parameters such that it exhibits pre-image resistance, collision resistance and second pre-image resistance; Random is a random value with sufficient entropy; DeviceLabel identifies the device whose ownership is being transferred; NewOwnerLabel is a value supplied by the new owner acknowledging the intent to become the new owner; and PreviousOwnerLabel is a value supplied by the previous owner acknowledging the intent to transfer ownership to the new owner. If the platform contains a platform ownership capability such that multiple OIC device instances hosted on the same platform would not require taking ownership subsequent to the first OIC device instance, the NewOwnerLabel identifies the platform ownership method and may reference the platform owner authorization data. The NewOwnerLabel values may be shared between OIC device and owner transfer service to facilitate OwnerPSK computation using the pseudo-random function.

In different embodiments, the OwnerPSK value may have the following formats in different examples, shown in Tables 1 and 2.

TABLE 1

128-bit key:

| Name | Value | Type | Description |
|---|---|---|---|
| Length | 16 | OCTET | Specifies the number of 8-bit octets following Length. |
| Key | opaque | OCTET Array | 16 byte array of octets. When used as input to a PSK function Length is omitted. |

TABLE 2

256-bit key:

| Name | Value | Type | Description |
|---|---|---|---|
| Length | 32 | OCTET | Specifies the number of 8-bit octets following Length. |
| Key | opaque | OCTET Array | 32 byte array of octets. When used as input to a PSK function Length is omitted. |

In different embodiments, various modes of device owner self-assertion may be realized. In a first embodiment, a protocol between a device on-boarding tool and a device owned by a manufacturer may be used. Referring now to FIG. 1, shown is a diagram illustrating an on-boarding and owner transfer method relying on a manufacturer-supplied token that is an indication of the intent to transfer ownership, in accordance with an embodiment.

In this embodiment, the manufacturer supplies an ownership transfer token via an out-of-band channel and the verification of the token is achieved by comparing the token with an embedded copy stored in a protected memory within the device. The protocol depends on a Diffie-Hellman key agreement protocol to dynamically establish a secure connection without dependence on a common public key infrastructure (PKI) that issues certificates or some other third party that is presumed to be trusted by both parties. Often, such third parties do not exist in practice hence only serve to confuse actual security semantics of device owner transfer logic. This not intended to suggest that use of a PKI, certificates or asymmetric cryptography may not be used in the construction of a secure session based on a key agreement protocol such as Diffie-Hellman, as described in FIG. 2B, below.

FIG. 1 shows a set of interactions between an on-boarding tool 110 (which may be a server or other computing system of an IoT network owner) and a new device 120 to be incorporated into a given IoT network (e.g., any given type of IoT computing device) in an environment 100. To enable on-boarding of the new device and to update ownership, e.g., to a common entity that owns on-boarding tool 110 and the IoT network, a device owner transfer method 130 is shown. In the embodiment of FIG. 1, device owner transfer method 130 provides a sequence of communications to enable ownership establishment of a device that is previously in an unowned state (e.g., as originally configured by a manufacturer of the device). The embodiment of FIG. 1 provides a method 130 to perform a shared PIN device owner transfer method.

In general, method 130 shown in FIG. 1 includes a process for establishing an owner pre-shared key (PSK), e.g., via a Diffie-Hellmann exchange process. The devices may perform a negotiation or discovery of the device to be on-boarded, and perform a process to enable the device to verify that the on-boarding tool is authentic and trusted, such that after a first session is established to generate the owner PSK and then terminated, a secure provisioning channel can be established using this owner PSK. This establishment of a secure channel thus indicates to the device that the on-boarding tool can be trusted and a valid exchange of a set of credentials to be shared between the devices can occur. In addition, assuming the process is correctly performed, the device can self-assert that it is now owned.

To begin method 130, new devices are found (block 135). Note that each of the following numbered communications is a given communication of a portion of an owner transfer process between on-boarding tool 110 and new device 120. Further, for each portion of the processor the first communication may be sent from on-boarding tool 110 to new device 120, and the last communication from new device 120 to on-boarding tool 110, unless otherwise stated.

1. Get/oic/sec/doxm?Owned="FALSE"
2. RSP ({*OxmType":"oic.sec.doxm.pin*, "Oxm": "0", "Owned":"FALSE", "DidFormat": "0", "DeviceID": "uuidA2IC-E000-0000-0000* . . . })
3. POST/oic/sec/doxm ({ . . . "OxmSel": "oic.sec.doxm.pin", . . . })
4. RSP 2.04
5. GET/oic/sec/pstat
6. RSP ({"IsOp":"FALSE", "Cm": "bx0011.1110", "Tm": "bx0011.1110, "DeviceID":, "Om": "bx0000,0000", "Sm": "bx0000,0011", "CommitHash":})

Next, at block 140 the on-boarding tool instructs the new device how provisioning will be achieved. In an embodiment, the following messages may be sent.

7. PUT/oic/sec/pstat ({ . . . , "Om": "bx0000,0011", . . . })
8. RSP 2.04

Next at block 150, a secure device owner shared PIN method may be performed. In an embodiment, this method may be performed based on the PSK. Understand that in other situations an asymmetric credential could be used. In an embodiment, the communications to perform this portion of the process include:

9. ClientHello (TLS_ECDHE_PSK_WITH_AES_128_CBC_SHA)
10. HelloVerifyRequest(cookie)
11. ClientHello(cookie)
12. ServerHello( ); ServerKeyExchange(ECDH PublicKey+ECC Curve Param); ServerHelloDone( )

Next at block 155 a pre-shared key can be computed, e.g., according to a password-based key derivation function, such as: PBKDF2(PRF, PIN, new device ID, dklen), described further below. In an embodiment, a Diffie-Hellmann process may be performed to establish this pre-shared key. This operation defines a PIN that may be used with a DH construction of $G^{a'}$ and $G^{b'}$ values, where a'=a+PIN and b'=b+PIN. The a' and b' values can be found only if the PIN value is known to both endpoints. This can happen if the PIN is communicated over an out-of-band channel that establishes physical proximity. For example, one proximity implementation is an ultrasonic speaker/microphone to communicate a PIN where physical barriers may prevent an unauthorized listener from hearing/recording the PIN broadcast. Hence it is resistant to some attacks where the attacker cannot be physically proximal to the endpoints. In an embodiment, communications for this computation may include:

13. ClientKeyExchange(ECDH PublicKey); ChangeCipherSpec+Finish
14. ChangeCipherSpec+Finish
15. PUT/oic/sec/doxm ({ . . . ,"DevOwner": "uuid:B0B0-0000-0000-0000", . . . })
16. RSP 2.04

Thereafter, at block 160 both sides compute the owner PSK. In an embodiment, on-boarding tool 110 may compute the owner PSK as follows:

17. OwnerPSK=PRF(MasterSecret, "oic.sec.doxm.jw", "uuid:B0B0-0000-0000-0000", "uuid:A21C-E000-0000-0000", "63"). This method thus avoids use of a PIN to compute $G^a$ and $G^b$. However, a PRF construction for PIN may be similar, substituting ". . . doxm.jw" for ". . . doxm.rdp," implying the PIN method was used/intended.

And in turn, new device 120 may compute the owner PSK as follows:

18. OwnerPsk=PRF( . . . )
19. /oic/sec/pstat.Cm=bx0011,1100. Note at this point, the session may be terminated.

Thereafter, the owner PSK may be used to establish a new session having a secure provisioning channel, which in an embodiment may be a DTLS session (block 170). The session may be opened in both directions using the owner PSK as the pre-shared key provided to a supplied cipher suite, in one embodiment as follows:

20. Open DTLS session with OwnerPSK as the PSK for TL5_PSK_. . . cipher suite.

At block 180, the owner PSK may be used to construct a DTLS session to verify correct computation of the owner PSK. In this operation, note that new device 120 may self-assert that the device is now placed into an owned state. As such, this ownership change of state is initiated and performed solely within new device 120, without reliance on on-boarding tool 110. In this way, a device itself manages its own ownership state autonomously In an embodiment, the new device may set an owner status according to:

21. /oic/sec/doxm.Owned="TRUE."

Thereafter, a provisioning process may be performed in the secure session to provision the new device with supported credentials. First at block 185, the onboarding tool may query new device 120 for supported credential types (block 185). Next at block 186, the new device is provisioned with supported credential types. In an embodiment and based upon the supported credential types these credentials may include provisioning of: symmetric-pairwise, symmetric-groupwise, asymmetric-pairwise, and/or asymmetric-groupwise credentials. Note further that the supported credentials may further include credentials for provisioning services that may be used to continue/complete provisioning of an IoT device. Thereafter, at block 190, the new device may be provisioned with various resources. For example, a network security service may provision additional security credentials for accessing other services and devices. It may further provision Access Control Lists (ACL) and other policies. In some embodiments, device management settings, software/firmware updates, and so forth, also may be provisioned. Thereafter, the DTLS session may be closed.

In one embodiment, the PIN-based device owner transfer method of FIG. 1 uses a pseudo-random function (e.g., PBKDF2) defined by Request for Comments (RFC) 2898 and a PIN exchanged via an out-of-band method to generate the pre-shared key. The PIN-authenticated pre-shared key (PPSK) is supplied to a given TLS ciphersuite that accepts a PSK as follows:

PPSK=PBKDF2(PRF, PIN, DeviceID, c, dkLen), where the PBKDF2 function has the following parameters:
PRF—Uses the DTLS PRF;
PIN—obtain via out-of-band channel;
DeviceID—UUID of the new device;
c—Iteration count initialized to 1000, incremented upon each use; and
dkLen—Desired length of the derived PSK in octets.

Figure 2A:
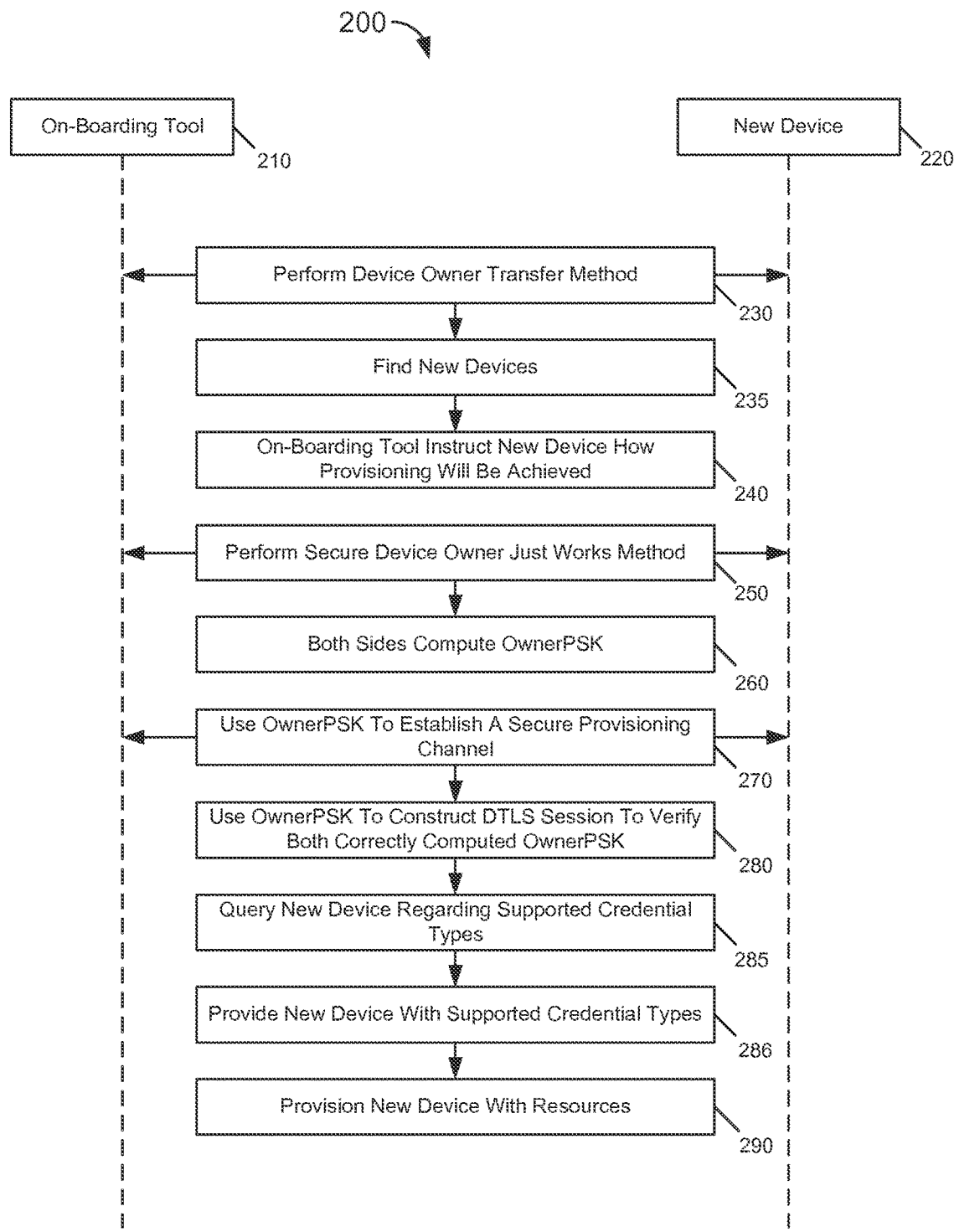
FIG. 2A is a diagram illustrating an on-boarding and owner transfer method in accordance with another embodiment.

Referring now to FIG. 2A, shown is a diagram illustrating an on-boarding and owner transfer method in accordance with another embodiment. In this configuration, an embodiment may rely on a spectrum analyzer for notification of signal intelligence warning of possible MITM threats to a Diffie-Hellman-based owner transfer method.

In the embodiment of FIG. 2A, an anonymous Diffie-Hellman key agreement protocol may be used to arrive at symmetric keys that are input to the OwnerPSK calculation. In this embodiment, an OwnerPSK calculation may follow the following format to ensure interoperability across different vendor products:

OwnerPSK=PRF(MasterSecret, Message, Length), where:
PRF uses a TLS PRF defined by RFC5246;
MasterSecret is the master secret key resulting from the DTLS handshake;
Message is a concatenation of the following:
 DoxmType string for the Just Works method (e.g. "oic.sec.doxm.jw");
 OwnerID is a URI identifying the device owner identifier and the device that maintains OwnerPSK;
 DeviceID is new device's DeviceID (e.g. "urn:uuid: XXXX-XXXX-XXXX-XXXX"); and
Length is the length of Message in octets.

As with FIG. 1, FIG. 2A shows a set of interactions between an on-boarding tool 210 and a new device 220 that occur in an environment 200. In the embodiment of FIG. 2A, device owner transfer method 230 provides a sequence of communications to enable ownership establishment of this new device that is on-boarded into a network in an unowned state. More specifically, the embodiment of FIG. 2A provides method 230 for performing a "JustWorks" device owner transfer method.

To begin method 230, new devices are found (block 235). In one embodiment, the following operations are included.

1. GET/oic/sec/doxm?Owned="FALSE"
2. RSP ({*OxmType":"oic.sec.doxm.jw", "Oxm": "0", "Owned":"FALSE", "DidFormat": "0", "DeviceID": "uuidA2IC-E000-0000-0000*. . . })
3. POST/oic/sec/doxm ({ . . . "OxmSel": "oic.sec.doxm.jw", . . . })
4. RSP 2.04
5. GET/oic/sec/pstat
6. RSP ({ "IsOp":"FALSE", "Cm": "bx0011.1110", "Tm": "bx0011.1110, "DeviceID":, "Om": "bx0000, 0000", "Sm": "bx0000,0011", "CommitHash":})

Next at block 240 the on-boarding tool instructs the new device how provisioning will be achieved. In an embodiment, the following messages may be sent.
7. PUT/oic/sec/pstat ({ . . . , "Om": "bx0000, 0011", . . . })
8. RSP 2.04

Next at block 250 a secure device owner JustWorks method may be performed. In an embodiment, the communications to perform this portion of the process include:
9. ClientHello (TLS_ECDH_anon_WITH_AES_128_CBC_SHA)
10. HelloVerifyRequest( )
11. ClientHello(cookie)
12. ServerHello( ); ServerKeyExchange(ECDH PublicKey+ECC Curve Param); ServerHelloDone( )
13. ClientKeyExchange(ECDH PublicKey); ChangeCipherSpec+Finish
14. ChangeCipherSpec+Finish
15. PUT/oic/sec/doxm ({ . . . , "DevOwner": "uuid:B0B0-0000-0000-0000", . . . })
16. RSP 2.04

Understand that in other embodiments another configuration suite that selects different algorithms employing an anonymous Diffie-Hellman protocol may be used, where an ephemeral elliptic-curve method, counter-based cipher block mode (e.g., CCM, GCM) or other encryption mode or SHA256 or other cryptographic hash may be used.

Next at block 260, the owner PSK can be computed by both sides. In an embodiment, on-boarding tool 210 may compute the owner PSK as follows:
17. OwnerPSK=PRF(MasterSecret, "oic.sec.doxm.jw", "uuid:B0B0-0000-0000-0000", "uuid:A21C-E000-0000-0000", "63")

And in turn, new device 220 may compute the owner PSK as follows:
18. OwnerPsk=PRF( . . . )
19. /oic/sec/pstat.Cm=bx0011,1100

Figure 2B:
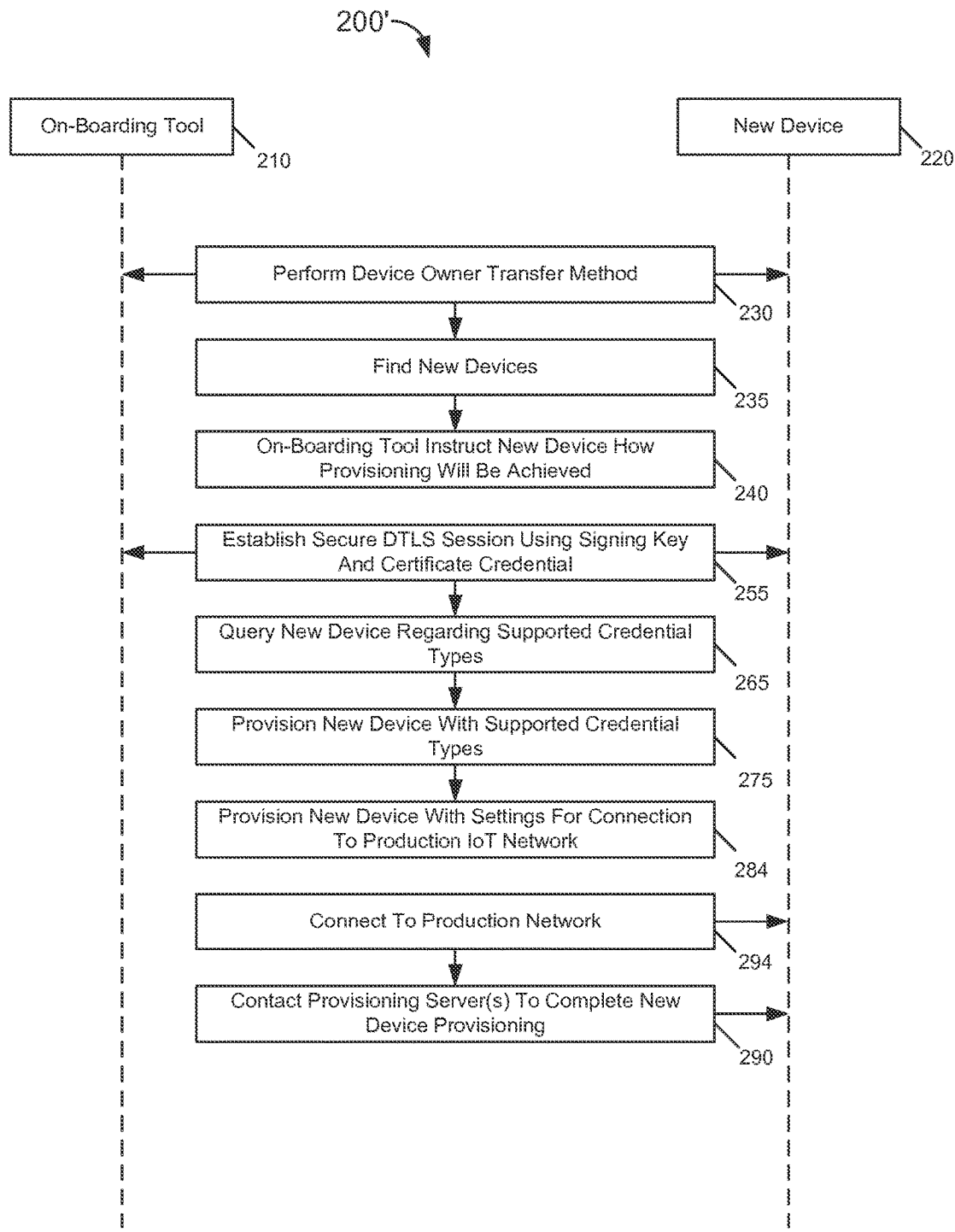
FIG. 2B is a diagram illustrating an on-boarding and owner transfer method in accordance with yet another embodiment of the present invention

Then after termination of this first session, as above the owner PSK may be used to establish a new secure session having a secure provisioning channel (block 270) in which a DTLS session is constructed, and thereafter the new device may be provisioned with supported credentials and resources (blocks 280, 285, 286 and 290). As above, in an embodiment the following communications may be performed in this portion of the process.
20. Open DTLS session with OwnerPSK as the PSK for TL5_PSK_. . . cipher suite
21. /oic/sec/doxm.Owned="TRUE"
22. Close DTLS Session In yet another embodiment, another owner transfer method may be used in which signing keys and certificate credentials may be used to establish a secure session. Referring now to FIG. 2B, shown is a diagram illustrating an on-boarding and owner transfer method in accordance with yet another embodiment of the present invention. As shown in FIG. 2B, environment 200' includes similar on-boarding tool 210 and new device 220. Note that method 230 to perform a device owner transfer operation may proceed similarly as discussed above in FIG. 2A at blocks 235 and 240. Thereafter at block 255 a secure DTLS session may be established using signing keys and a certificate credential. More specifically, a DTLS session may be established using an elliptic curve digital signature algorithm (ECDSA) or an Intel® enhanced privacy identifier (EPID) signing key and certificate credential. In an embodiment an Intel® Sigma-based protocol may be used.

Still with reference to FIG. 2B, at block 265 the new device may be queried by the on-boarding tool regarding supported credential types. Then at block 275 the new device may be provisioned with supported credential types. Based on such supported credential types, symmetric-pairwise credentials (e.g., including an OwnerPSK), symmetric-groupwise, asymmetric-pairwise, and/or a symmetric-groupwise credentials may be provisioned. Note that such credentials may include credentials for provisioning services to be used to continue/complete IoT device provisioning. Thereafter at block 284 the new device is provisioned with settings for connection to a production IoT network. Note that some settings may involve connecting to a different wireless access point or network interface which, in an embodiment, may use the credentials provisioned in block 275. Thereafter at block 294, new device 220 may connect to the production network. Then at block 296 the new device may contact one or more provisioning servers in this production network to continue/complete new device provisioning.

Embodiments may provide flexibility for manufacturers that do not have secure storage resources or manufacturing capability to embed a token value at manufacturing time. For this mode, the context of on-boarding can be relied upon. The legitimate device owner establishes the context for device owner transfer by evaluating the likelihood that a man in the middle (MITM) attacker might reasonably be able to conduct the MITM attack constantly over the life of the device. For example, if the device relies on wireless communication technology such as Bluetooth, NFC or WiFi, the MITM attacker would be required to maintain a wireless connection that prevents the on-boarding system from directly accessing the new device and ensures the new device only depends on the MITM device for access to other legitimate devices. In practice, this attack is quite challenging.

The device owner may take additional steps to minimize the possibility of MITM attackers during on-boarding and ownership transfer. These operations may include manipulation of wireless broadcast signals to limit the radio range of both the new device and the on-boarding system. Additionally, the on-boarding environment may include a spectrum analysis device that monitors all wireless signals, ranking them accord to broadcast strength, origin and type. The on-boarding activity may be performed in the context of the signals' intelligence that may serve as an early warning mechanism and threat notification system. As an example, signal strength modulation of a wireless transmitting and receiving device may be used to minimize/mitigate the effectiveness of a MITM attack.

Figure 3:
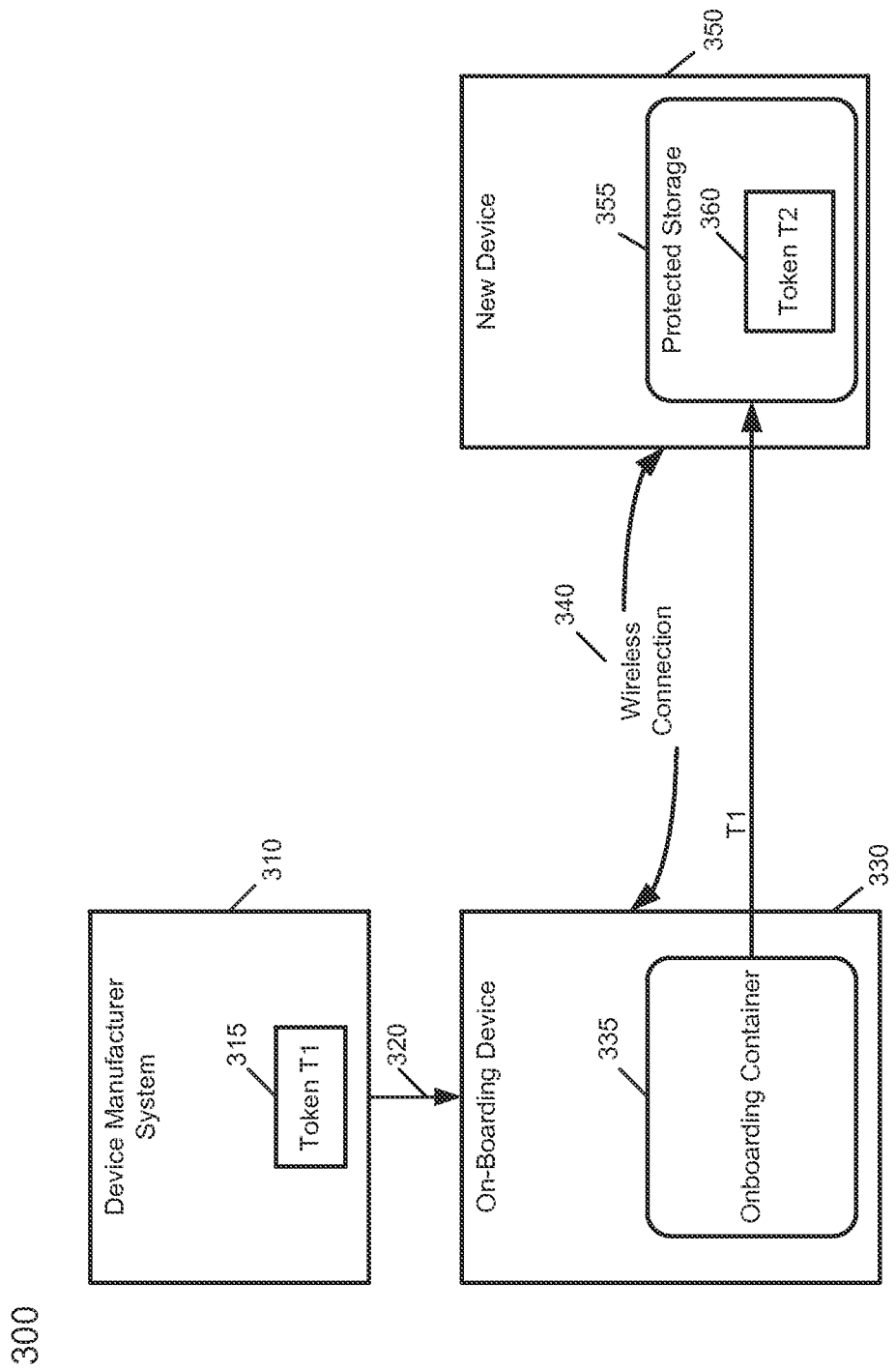
FIG. 3 is a block diagram of another ownership transfer method in accordance with an embodiment.

FIG. 3 is a block diagram of another ownership transfer method in accordance with an embodiment. In FIG. 3, an out-of-band (OOB) channel may be used by a manufacturer to share an owner transfer token with an owner's IoT device on-boarding tool.

As illustrated, FIG. 3 shows a network architecture 300 that includes a device manufacturer system 310, which may be a given system of a device manufacturer that manufactures an IoT device 350. A further system 330 is an on-boarding device for an IoT network in which device 350 is to be provisioned. Assume that device 350 is a new device to be provisioned into the IoT network and arrives in an unowned state. In this un-owned state, device 350 may store a token 360 (T2) provisioned by the device manufacturer during the manufacturing process, which may include the same value as a token to be provided to system 330, as discussed below.

As seen in arrangement 300, device manufacturer 310 provides a token 315 (T1) to on-boarding device 330. In an embodiment, this communication of the token may be via an out-of-band (OOB) channel 320, which may take different forms. Note that this token T1 may be an EPID or an asymmetric key to sign a Diffie-Hellmann exchange. In other cases, a certificate may be provided with an EPID for an unowned device group. This token may be stored in an on-boarding container 335, which may be a given TEE of the device.

As seen, a communication channel 340 is established between on-boarding device 330 and device 350. In an embodiment, this communication channel may be a wireless communication channel. The channel may be used, after establishment of a session, to provide the token T1 to device 350, e.g., via a Diffie-Hellmann exchange. Still further, a device ownership transfer method as described herein may be performed. More specifically, assuming that device 350 confirms that the received token T1 includes the same value (e.g., PIN, random number or so forth) as its stored token 360 (T2), it is determined that system 330 may be trusted and an ownership transfer may validly occur, such that new device 350 self-asserts that it is now in an un-owned state.

Figure 4:
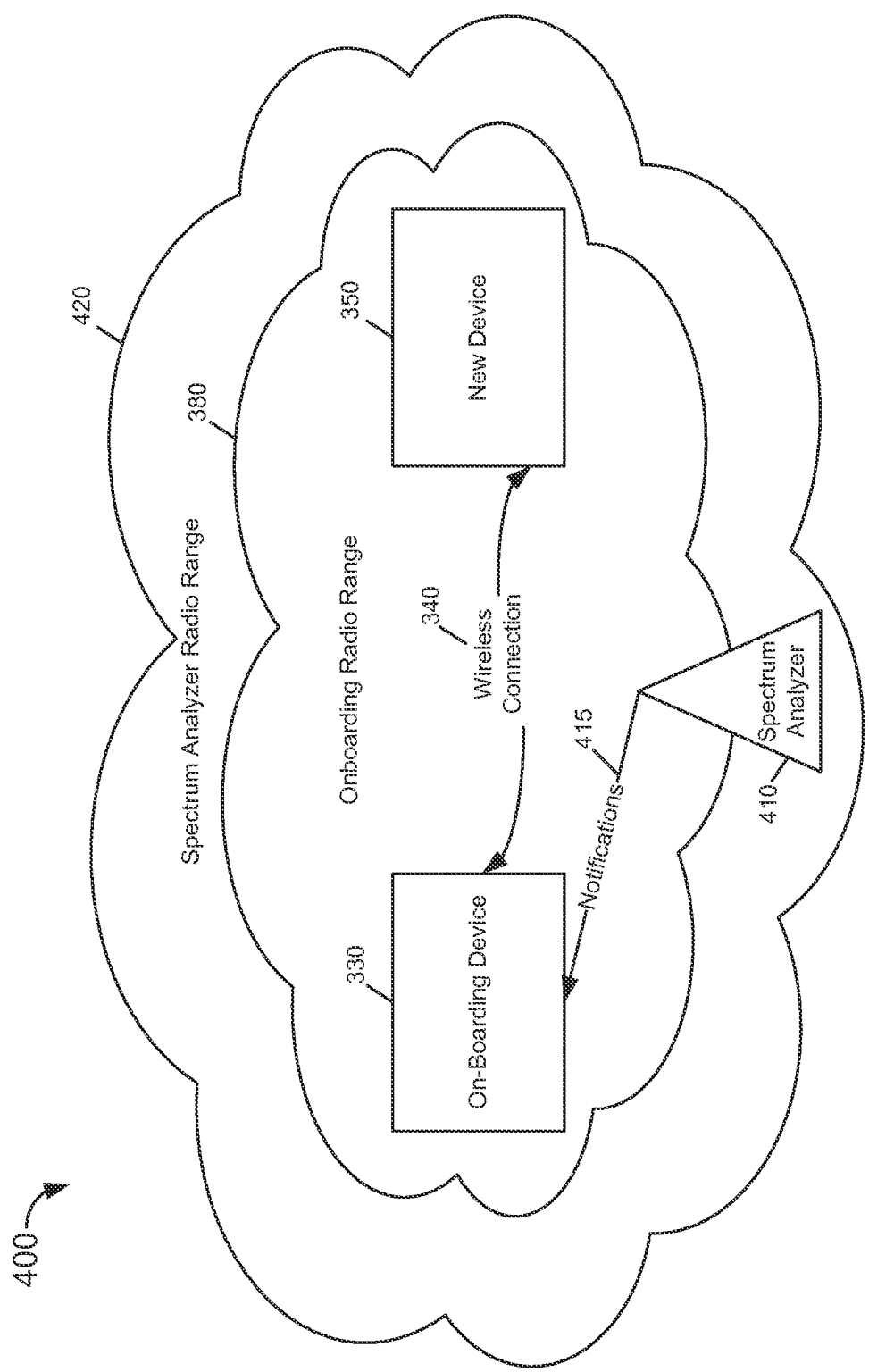
FIG. 4 is a method of using a spectrum analyzer to deliver early warning notification in accordance with an embodiment.

FIG. 4 is a method of using a spectrum analyzer to deliver early warning notification of a possible wireless MITM attacker during an IoT device on-boarding operation in accordance with an embodiment. Subsequent to on-boarding, the new device establishes that the entity that successfully completed on-boarding is its intended device owner. The device then disables the possibility of owner establishment.

Referring now to FIG. 4, illustrated is a network 400. As seen, network 400 includes a first radio range 420 and a second radio range 380. Note that radio range 420 has a larger range, namely the range in which signals can be detected by a spectrum analyzer 410. In turn, radio range 380 has a smaller range and may be an on-boarding radio range, namely the range of wireless communication, e.g., in a wireless local area network 340 such as a Bluetooth™ low energy network or other short-range wireless network in which an on-boarding device 330 and a new device 350 are located. These devices may participate in an on-boarding and provisioning process, such as described herein in which device ownership is established within device 350. To this end, to prevent unwanted intrusion, spectrum analyzer 410 may send notifications to on-boarding device 330, if unknown wireless signal activity is detected within radio range 420. In this way, if unknown or expected attacker-based wireless signaling is detected within radio range 420, spectrum analyzer 410 may issue one or more notifications to on-boarding tool 330 regarding spurious radio interference. Responsive to this information, on-boarding device 330 may take various appropriate actions, including signal strength modulation of one or more of devices 330 and 350. Such modulation may reduce the power or intensity of the wireless communications so that they do not communicate in the broader area of radio range 420. Understand that in some cases, the signal strength modulation may include preventing owner transfer communications, at least until the spectrum analyzer 410 indicates that the potential threat has been removed.

In an embodiment for an OIC-compliant device, a /oic/sec/doxm resource may contain the set of supported device owner transfer methods. Security resource are discoverable through a /oic/res resource. Resource discovery processing respects constraints (e.g., CRUDN) supplied as part of given security resource definitions. Table 3 is an owner transfer method resource definition in accordance with an embodiment of the present invention.

TABLE 3

| Fixed URI | Resource Type Title | Resource Type ID ("rt" value) | Interfaces | Description | Related Functional Interaction |
|---|---|---|---|---|---|
| /oic/sec/doxm | Device Owner Transfer Methods | urn:oic.sec.doxm | | Resource for supporting device owner transfer | Configuration |

Table 4 is an example owner transfer method properties definition in accordance with an embodiment of the present invention, where an existing device interaction protocol may be used to query device owner status and configuration.

TABLE 4

| Property Name | Operation | Instance | Mandatory | Type | Range | Description |
|---|---|---|---|---|---|---|
| Oxm | R | Multiple | Yes | OxmType | — | URN identifying the organization defining the owner transfer method and the method name. |
| OxmSel | R | Single | Yes | OxmType | — | The Oxm that was selected for device ownership transfer. |
| Owned | R | Single | Yes | Boolean | TIF | Indicates whether or not the device ownership has been established. FALSE indicates device is unowned. |

TABLE 4-continued

| Property Name | Operation | Instance | Mandatory | Type | Range | Description |
|---|---|---|---|---|---|---|
| DidFormat | R | Single | Yes | UINT8 | 0-255 | Enumerated device ID format. [0-URN] (e.g. urn:uuid:XXXX-XXXX-XXXX-XXXX) |
| DeviceID | R | Single | Yes | OCTET[ ] | — | DeviceID assigned to this instance of the OIC framework. DidFormat determines how to interpret the OCTET string |
| DevOwner | R | Single | Yes | oic.sec.svc | — | URI identifying a service that is the device owner. This may be any value chosen by the device owner. |
| Rowner | R | Single | Yes | oic.sec.svc | — | This resource's owner. Typically this is the bootstrap service that instantiated this resource. |
| Supported Credential Types | R | Single | Yes | BITMASK | — | Bitmask of credential types this device can support. |

As shown in Table 4, the owner transfer method resource contains an ordered list of owner transfer methods where the first entry in the list is the highest priority method and the last entry the lowest priority. The device manufacturer may configure this resource, e.g., with the most desirable (most secure) methods with high priority and least desirable with low priority. The network management tool may query this list at the time of on-boarding when the network management tool selects the most appropriate method. Subsequent to an owner transfer method being chosen, the agreed upon method is entered into the /doxm resource using the OxmSel property.

In an embodiment, owner transfer methods include two parts, a URN identifying the vendor or organization and the specific method.

```
<OxmType> ::= "urn:" <NID> ":" <NSS>
<NID> :: = 1 <Vendor-Organization>
<NSS> ::= <Method> | {<NameSpaceQualifier> "."} <Method>
<NameSpaceQualifier> ::= String
```

-continued

```
<Method> ::= String
<Vendor-Organization> ::= String
```

When an owner transfer method successfully completes, the Owned property is set to '1' (TRUE). Consequently, subsequent attempts to take ownership of the device will fail. A Secure Resource Manager (SRM) generates a device identifier (DeviceID) that is stored in the /oic/sec/doxm resource in response to successful ownership transfer. Owner transfer methods may communicate the DeviceID to the service that is taking ownership. The service may associate the DeviceID with the OwnerPSK in a secured database. Once owned, a bootstrap service may change the owned state to '0' (FALSE).

Table 5 shows owner transfer methods in accordance with an embodiment.

TABLE 5

| Value Type Name | Value Type URN | Enumeration Value | Description |
|---|---|---|---|
| OICJustWorks | urn:oic:oic"sec.doxm.jw | 0 | The just works method relies on anonymous Diffie-Hellman exchange to realize a shared secret. It is subject to man-in-the-middle threats. |
| OICSharedPin | urn:oic:oic"sec.doxm.pin | 1 | The shared PIN method relies on an out-of-band PIN distribution method to generate a shared secret that mitigates many man-in-the-middle threats. |

Thus in various embodiments, during a device owner transfer of an IoT device, a network analyzer may inform the owner transfer endpoint of possible MITM attacks on wireless networks. A manufacturer-issued token that may be supplied in an IoT device in secure memory, and an out-of-band channel (such as product packaging, QR code, IM, text, email, CDROM, post card or social media) may be used to communicate the token value.

More specifically, a token is input to a Diffie-Hellman key agreement protocol, where the secure DH endpoint is also the secure storage endpoint. The comparison of the token value obtained through the out-of-band channel is securely delivered to the secure storage endpoint and compared with the embedded token value to determine that the device ownership is established. In an embodiment, a TEE may be used to securely process the DH endpoint, protect the token value and to maintain/update the device owner state.

In some embodiments, an IoT resource framework may be used to represent the device owner transfer protocol and status to another IoT device using the native messaging protocol of the other IoT device.

Embodiments enable use of a wireless spectrum analyzer to inform an owner transfer endpoint of possible wireless MITM attacker when computing a Diffie-Hellman key agreement protocol. In some embodiments, a manufacturer token may optionally be used to assert ownership transfer of a device when the token is communicated to an intended owner over an out-of-band channel.

Figure 5:
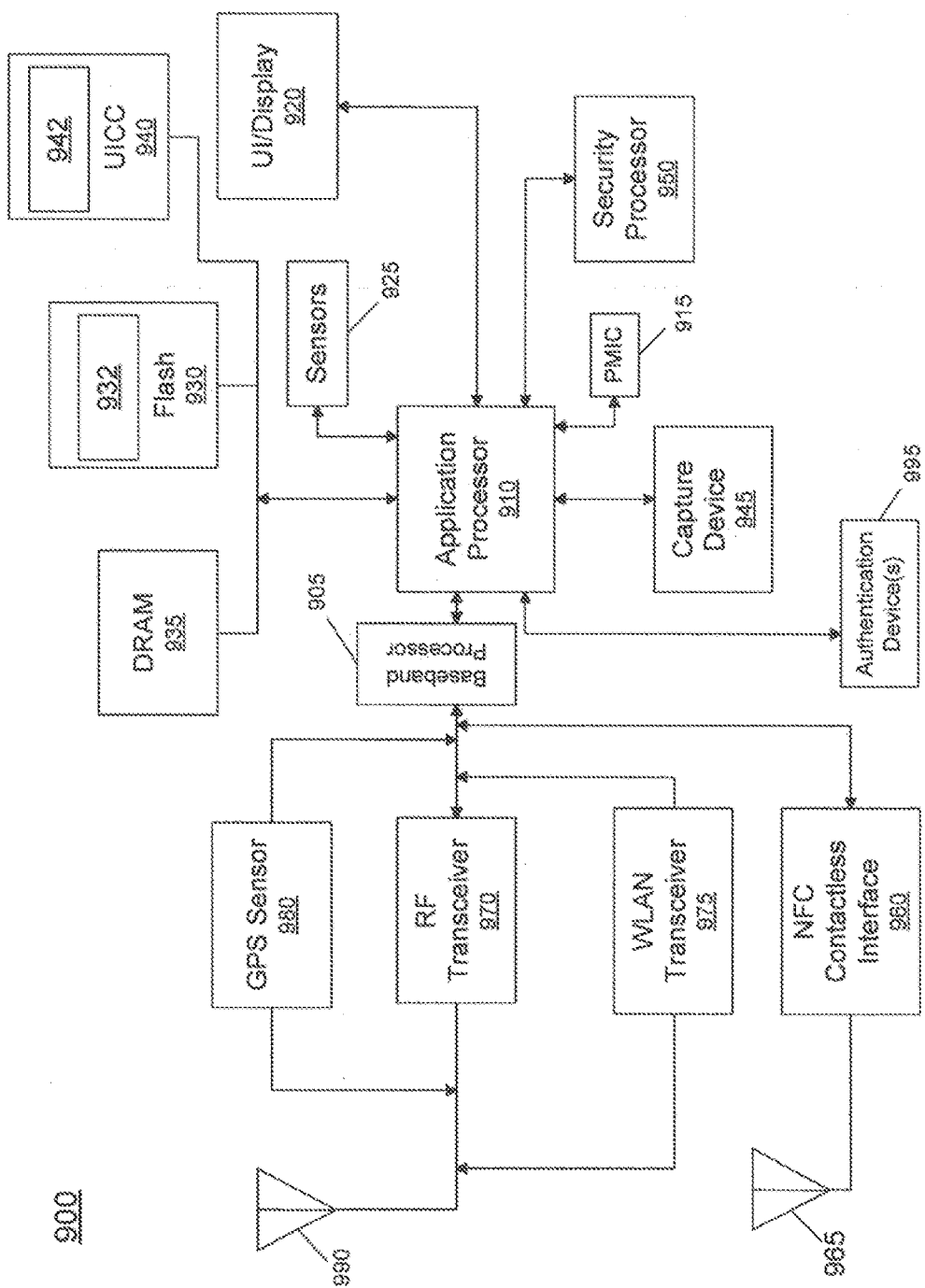
FIG. 5 is a block diagram of an example system with which embodiments can be used.

Referring now to FIG. 5, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 5, a universal integrated circuit card (UICC) 940 comprises a subscriber identity module, which in some embodiments includes a secure storage 942 to store secure user information. System 900 may further include a security processor 950 that may that may implement a TEE as described earlier, and which may couple to application processor 910. Furthermore, application processor 910 may implement a secure mode of operation, such as Intel® SGX for hosting of a TEE, as described earlier. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 5, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 6:
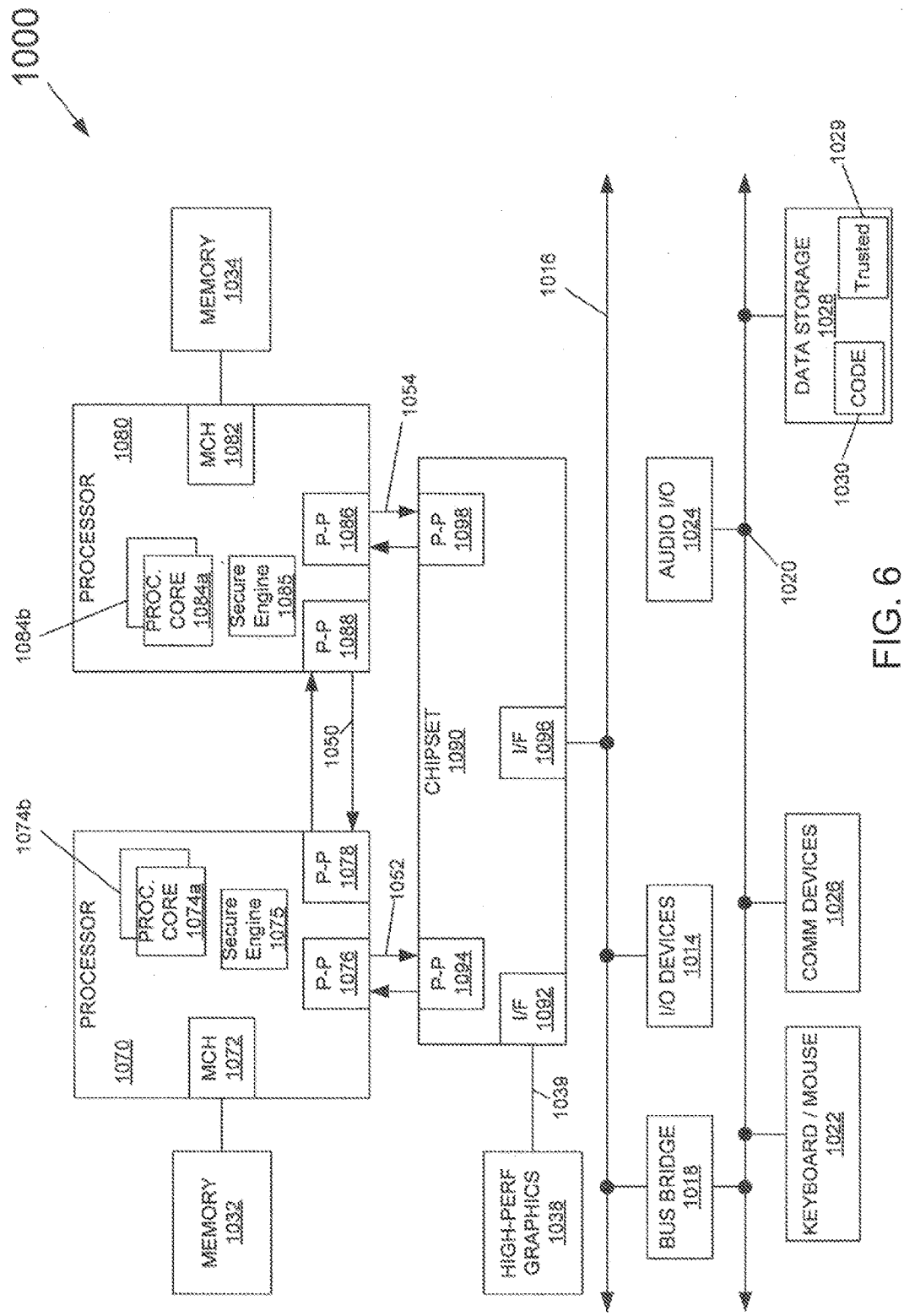
FIG. 6 is a block diagram of a system in accordance with another embodiment of the present invention.

Referring now to FIG. 6, shown is a block diagram of a system in accordance with another embodiment of the present invention. As shown in FIG. 6, multiprocessor system 1000 is a point-to-point interconnect system such as a server system, and includes a first processor 1070 and a second processor 1080 coupled via a point-to-point interconnect 1050. As shown in FIG. 6, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network on-boarding or so forth.

Still referring to FIG. 6, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 6, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 6, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 6, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 7:
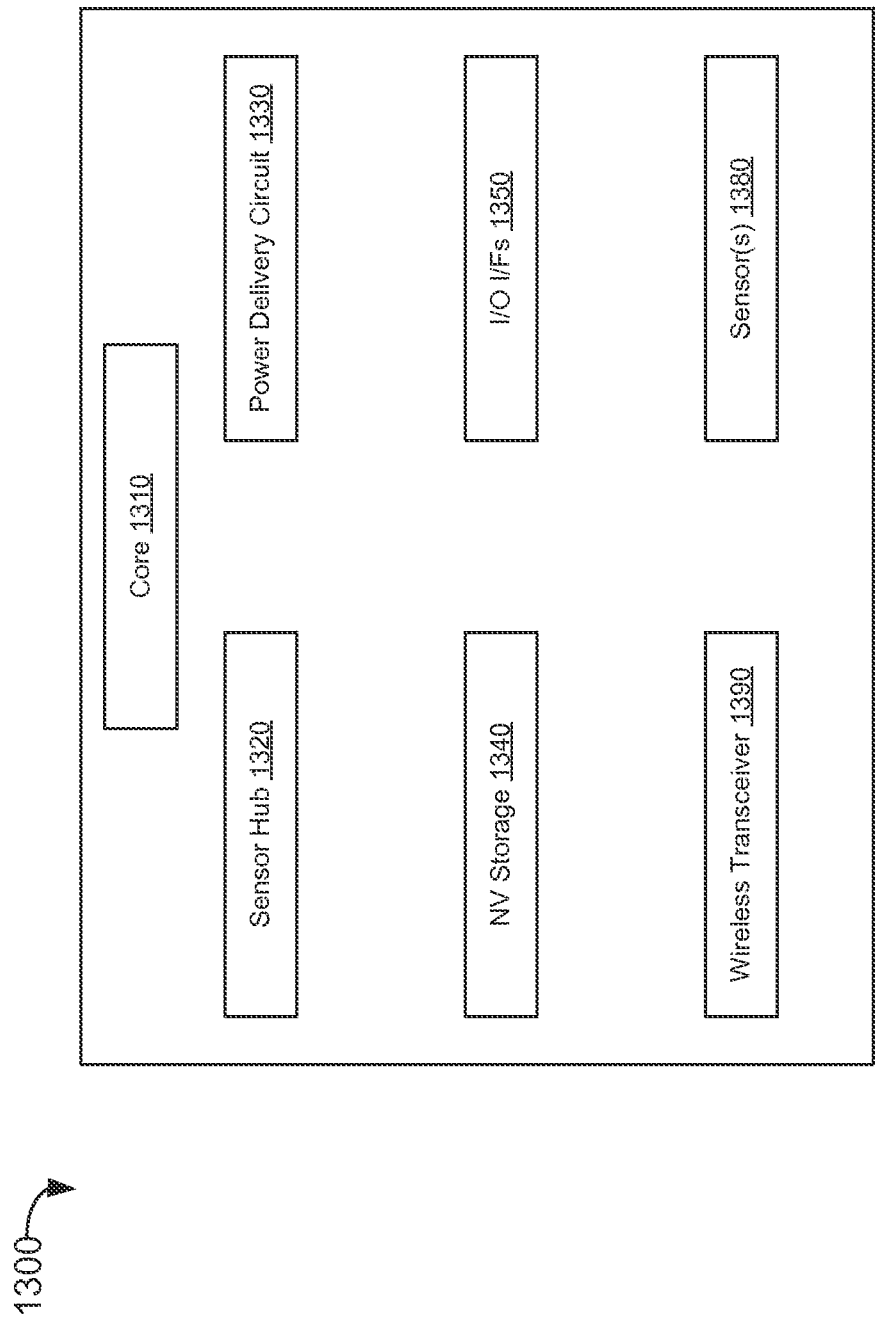
FIG. 7 is a block diagram of a wearable module in accordance with another embodiment.

Embodiments may be used in environments where IoT devices may include wearable devices or other small form factor IoT devices. Referring now to FIG. 7, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms.

Figure 8:
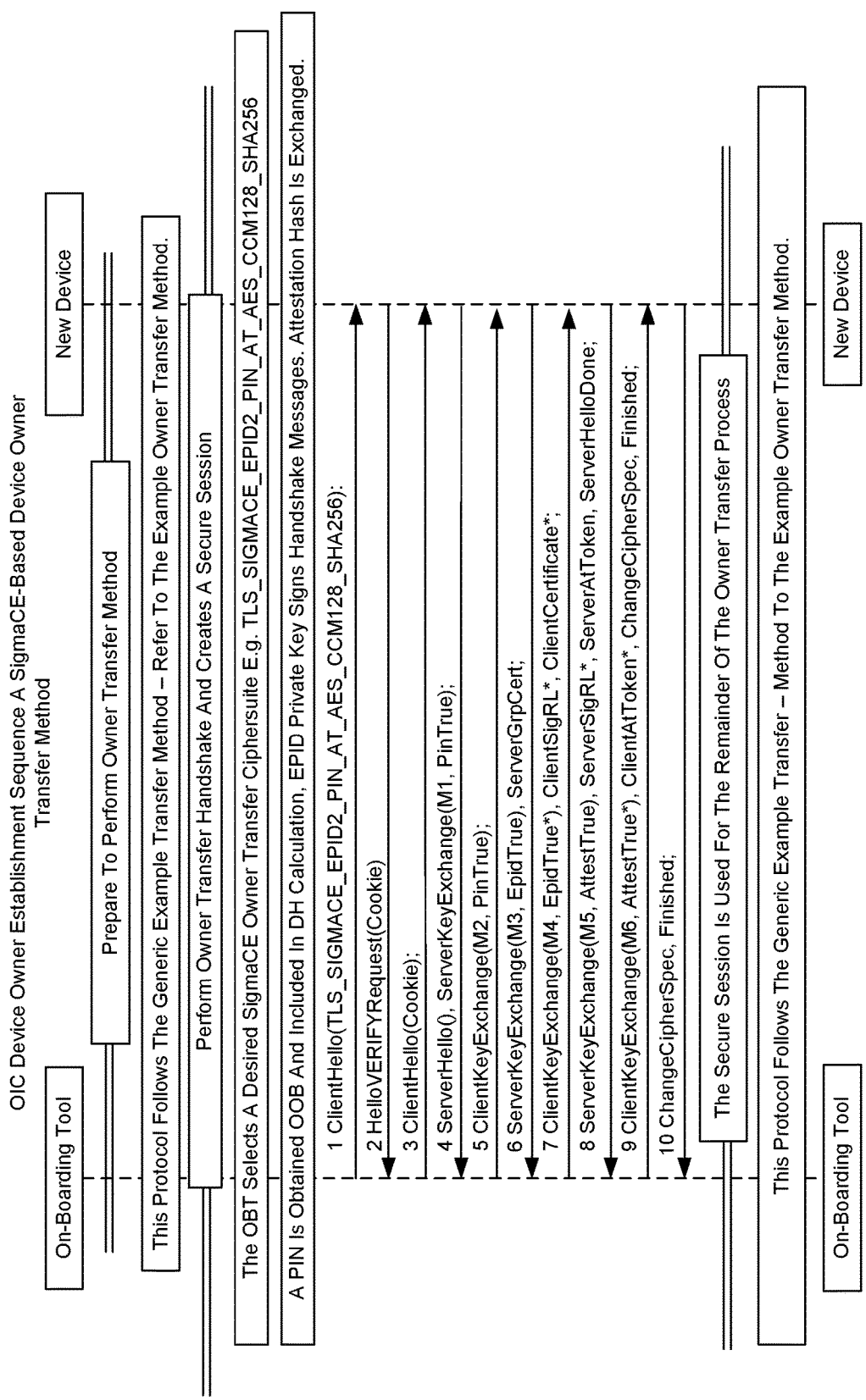
FIG. 8, 9, 10A and 10B illustrate on-boarding sequence in accordance with embodiments.
Figure 9:
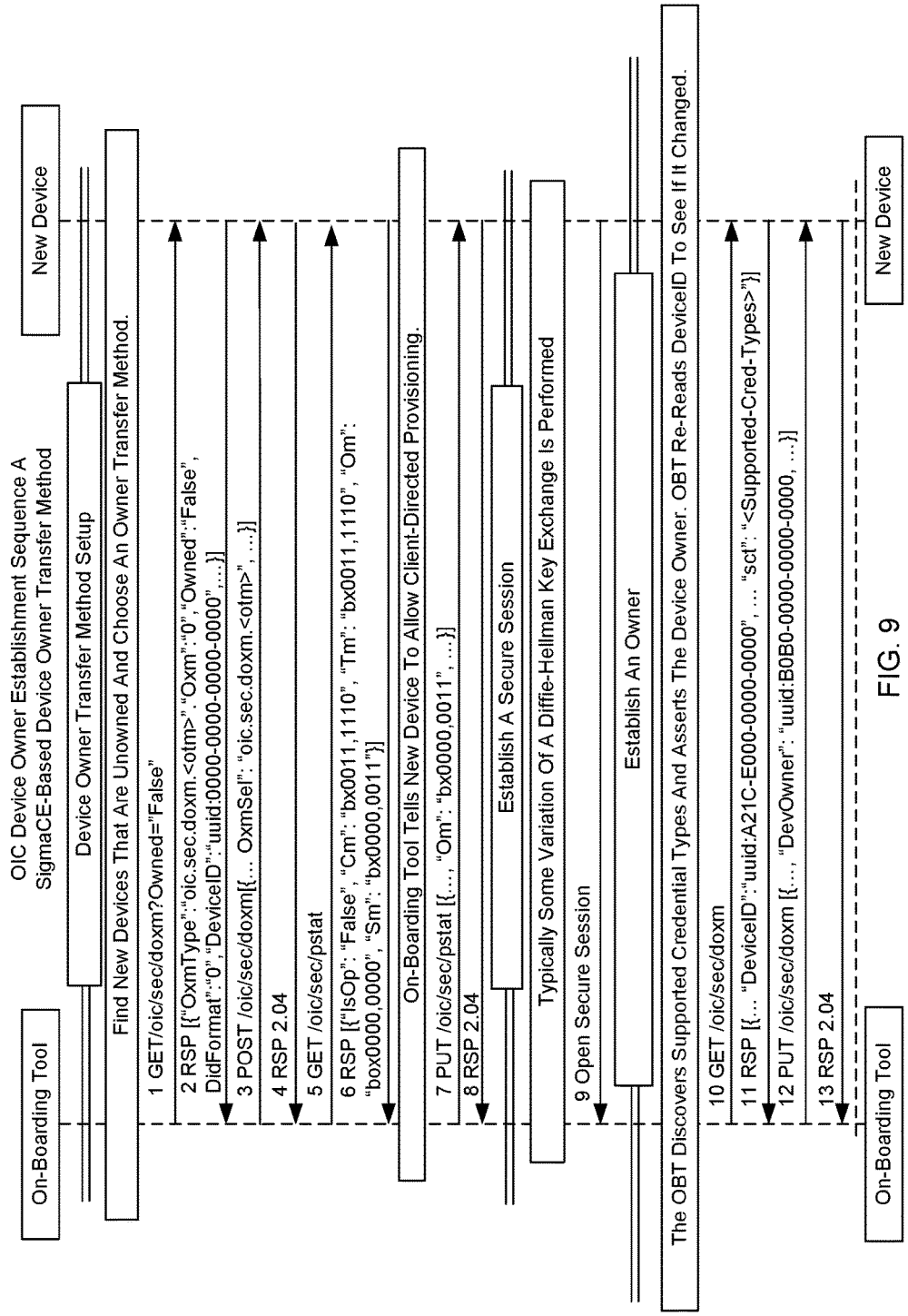
Figure 10A:
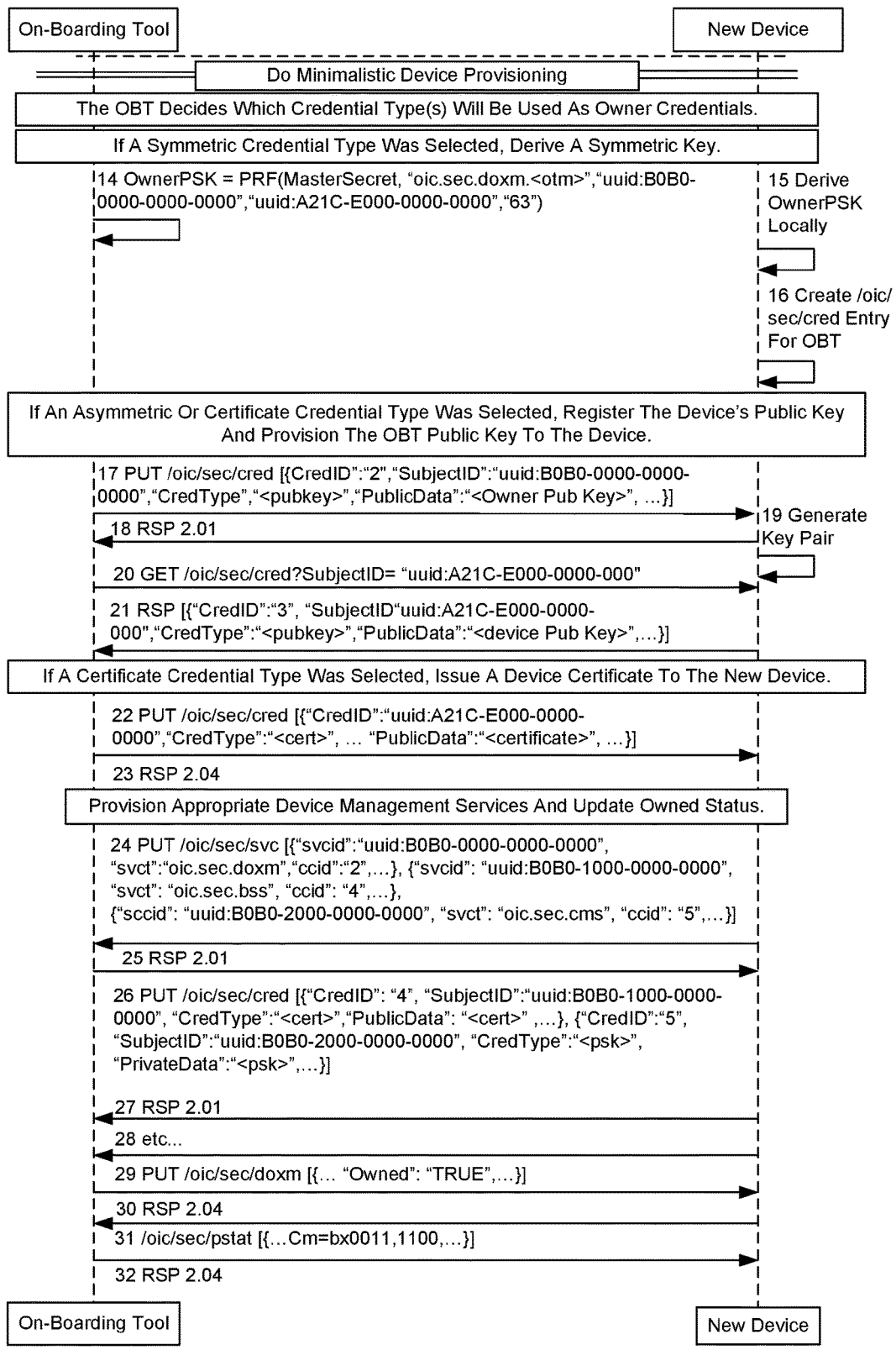
Figure 10B:
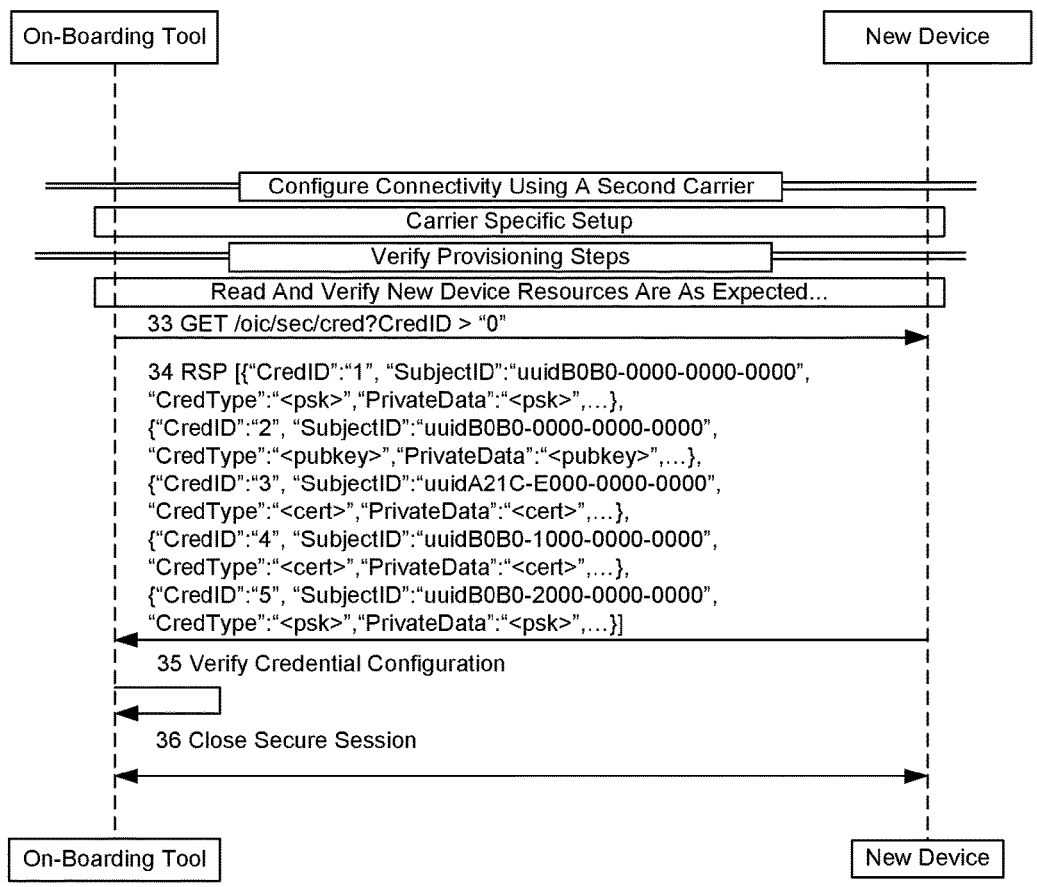

As discussed above, in some embodiments a sign-and-MAC protocol may be used in performing a device owner transfer method. FIG. 8 shows a high level view of an example Intel® Sigma-based Diffie-Hellman exchange used in performing a device owner transfer for IoT devices. As illustrated in FIG. 8, a combination of owner transfer authorization factors are exchanged including a proximity PIN, plus an attestation hash of the new device's trusted execution environment configuration, plus a signature of the DH messages using an EPID signing key. Understand other embodiments are not limited to EPID signing. FIGS. 9, 10A and 10B, describe further details of an on-boarding sequence of such a device owner transfer as described in FIG. 2B.

The following Examples pertain to further embodiments.

In Example 1, a system comprises: a first device having at least one processor and a secure storage and having a first TEE; and an on-boarding system coupled to the first device within a first network. The on-boarding system may include a second TEE, and may receive a request to transfer ownership of the first device to a new owner, receive notification information from a spectrum analyzer regarding wireless signal information within the first network, and perform a native communication protocol between the on-boarding system and the first device to communicate ownership information to execute the ownership transfer to the new owner, to cause the first device to store the ownership information in a storage of the first device.

In Example 2, the on-boarding system is to receive a first token from a manufacturer of the first device and provide the first token to the first device.

In Example 3, the first device comprises an IoT device and which is to compare the first token to a stored token, and update an ownership indicator of the first device to indicate that the first device is owned, based at least in part on the comparison.

In Example 4, the first device is to be introduced into the first network in an unowned state.

In Example 5, the native communication protocol comprises a predetermined communication protocol to enable non-owner transfer communications.

In Example 6, the native communication protocol comprises an in-band communication between the on-boarding system and the first device.

In Example 7, the first device is to self-assert that it is to be owned by the new owner, without reliance on the on-boarding system.

In Example 8, the native communication protocol includes establishment of a Diffie-Hellmann session between the on-boarding system and the first device, to establish an owner pre-shared key.

In Example 9, the native communication protocol includes a secure session to be established using the owner pre-shared key.

In Example 10, according to the native communication protocol, the on-boarding system is to: instruct the first device regarding a provisioning technique for the ownership transfer; calculate the owner pre-shared key and compare the calculated owner pre-shared key to a received pre-shared key, establish a secure provisioning channel between the on-boarding system and the first device using the owner pre-shared key; and provision the first device with one or more resources via the secure provisioning channel.

In Example 11, the native communication protocol includes a shared PIN process to execute the ownership transfer.

In Example 12, the first device is to self-assert ownership by the new owner during the secure session.

In Example 13, the on-boarding system is to determine if a potential attacker is within a radio range of the first network based on the wireless signal information, and responsive to the determination that the potential attacker is within the radio range, manipulate a signal strength of the on-boarding system and the first device, to limit an emission range of the on-boarding system and the first device.

In Example 14, a method comprises: receiving, in an on-boarding system for a first network, a request to transfer ownership of a first device having a trusted execution environment to a new owner; receiving, in the on-boarding system, notification information from a spectrum analyzer regarding wireless signal information within the first network; determining if a potential attacker is within a radio range of the first network based on the wireless signal information; responsive to determining that the potential attacker is within the radio range, manipulating a signal strength of the on-boarding system and the first device, to limit an emission range of the on-boarding system and the first device; and performing a native communication protocol between the on-boarding system and the first device to communicate ownership information to execute the ownership transfer to the new owner, to enable the first device to store the ownership information in a storage of the first device.

In Example 15, the method further comprises receiving, in the on-boarding system, a first token via an out-of-band channel, from a manufacturer of the first device; and sending the first token to the first device via a secure channel.

In Example 16, responsive to receipt of the first token, the first device is to compare the first token to a stored token present in a secure storage of the first device, the stored token stored by the manufacturer of the first device, and update an owner status, based at least in part on the comparison.

In Example 17, the method further comprises preventing the ownership information communication responsive to the radio range determination.

In Example 18, a method comprises: establishing a first secure session between an on-boarding system of an IoT network and a device to be introduced into the IoT network, the device in an unowned state at the introduction; computing an owner PSK in the device in the first secure session, storing the owner PSK in a storage of the device, and thereafter terminating the first secure session; establishing a second secure session between the on-boarding system and the device, using the owner PSK; and responsive to successfully establishing the second secure session, autonomously updating an ownership state of the device to an owned state.

In Example 19, the method further comprises: receiving a command from the on-boarding system to manipulate a signal strength of the device; and responsive to receiving the command, reducing a signal level of a wireless channel of the first secure session to limit an emission range of the device.

On Example 20, the method further comprises: receiving a first token from the on-boarding system, the first token received in the on-boarding system from a manufacturer of the device via an out-of-band channel; comparing the first token to a stored token stored in a secure storage of the device, the stored token stored by the manufacturer of the device; and updating the ownership state of the device, based at least in part on the comparison.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 21, a system comprises: means for receiving a request to transfer ownership of a first device having a trusted execution environment to a new owner; means for receiving notification information from a spectrum analyzer regarding wireless signal information within the a network; means for determining if a potential attacker is within a radio range of the first network based on the wireless signal information; means for manipulating a signal strength of the system and the first device, to limit an emission range of the system and the first device, responsive to determining that the potential attacker is within the radio range; and means for performing a native communication protocol between the system and the first device to communicate ownership information to execute the ownership transfer to the new owner, to enable the first device to store the ownership information in a storage of the first device.

In Example 22, the system further comprises means for receiving a first token via an out-of-band channel, from a manufacturer of the first device; and means for sending the first token to the first device via a secure channel.

In Example 23, the system further comprises means for preventing the ownership information communication responsive to the radio range determination.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising: a first device having at least one processor and a secure storage and having a first trusted execution environment (TEE); and
   an on-boarding system coupled to the first device within a first network, the onboarding system including a second TEE, the on-boarding system to receive a request to transfer ownership of the first device to a new owner, receive notification information from a spectrum analyzer regarding unknown wireless signal information regarding at least one of unknown wireless signal activity and attacker-based wireless signal activity within the first network, and perform a native communication protocol between the on-boarding system and the first device to communicate ownership information to execute the ownership transfer to the new owner, to cause the first device to store the ownership information in a storage of the first device, the first device to autonomously self-assert that it is in an owned state, without reliance on the on-boarding system, wherein the on-boarding system is to determine if a potential attacker is within a radio range of the first network based on the unknown wireless signal information, and responsive to the determination that the potential attacker is within the radio range, manipulate a signal strength of the on-boarding system and the first device, to limit an emission range of the on-boarding system and the first device.

2. The system of claim 1, wherein the on-boarding system is to receive a first token from a manufacturer of the first device and provide the first token to the first device.

3. The system of claim 2, wherein the first device comprises an Internet of Things (IoT) device and is to compare the first token to a stored token, and update an ownership indicator of the first device to indicate that the first device is owned, based at least in part on the comparison.

4. The system of claim 1, wherein the first device is to be introduced into the first network in an unowned state.

5. The system of claim 1, wherein the native communication protocol comprises a predetermined communication protocol to enable non-owner transfer communications.

6. The system of claim 1, wherein the native communication protocol comprises an in-band communication between the on-boarding system and the first device.

7. The system of claim 1, wherein the native communication protocol includes establishment of a Diffie-Hellmann session between the on-boarding system and the first device, to establish an owner pre-shared key.

8. The system of claim 7, wherein the native communication protocol includes a secure session to be established using the owner pre-shared key.

9. The system of claim 7, wherein according to the native communication protocol, the on-boarding system is to:
instruct the first device regarding a provisioning technique for the ownership transfer;
calculate the owner pre-shared key and compare the calculated owner pre-shared key to a received pre-shared key, establish a secure provisioning channel between the on-boarding system and the first device using the owner pre-shared key; and
provision the first device with one or more resources via the secure provisioning channel.

10. The system of claim 7, wherein the native communication protocol includes a shared PIN process to execute the ownership transfer.

11. The system of claim 8, wherein the first device is to self-assert ownership by the new owner during the secure session.

12. At least one non-transitory computer readable storage medium comprising instructions that when executed enable a system to: receive, in an on-boarding system for a first network, a request to transfer ownership of a first device having a trusted execution environment to a new owner;
receive, in the on-boarding system, notification information from a spectrum analyzer regarding unknown wireless signal information regarding at least one of unknown wireless signal activity and attacker-based wireless signal activity within the first network; determine if a potential attacker is within a radio range of the first network based on the unknown wireless signal information; responsive to determining that the potential attacker is within the radio range, manipulate a signal strength of the on-boarding system and the first device, to limit an emission range of the on-boarding system and the first device; and
perform a native communication protocol between the on-boarding system and the first device to communicate ownership information to execute the ownership transfer to the new owner, to enable the first device to store the ownership information in a storage of the first device, the first device to autonomously self-assert that it is in an owned state, without reliance on the on-boarding system.

13. The at least one non-transitory computer readable storage medium of claim 12, further comprising instructions that when executed enable the system to:
receive, in the on-boarding system, a first token via an out-of-band channel, from a manufacturer of the first device; and
send the first token to the first device via a secure channel.

14. The at least one non-transitory computer readable storage medium of claim 13, wherein responsive to receipt of the first token, the first device is to compare the first token to a stored token present in a secure storage of the first device, the stored token stored by the manufacturer of the first device, and update an owner status, based at least in part on the comparison.

15. The at least one non-transitory computer readable storage medium of claim 12, further comprising instructions that when executed enable the system to prevent the ownership information communication responsive to the radio range determination.

16. A method comprising:
establishing a first secure session between an on-boarding system of an Internet of Things (IoT) network and a device to be introduced into the IoT network, the device in an unowned state at the introduction;
in response to a determination by the on-boarding system that a potential attacker is within a radio range of the IoT network based on unknown wireless signal information, the unknown wireless signal information regarding at least one of unknown wireless signal activity and attacker-based wireless signal activity received in the on-boarding system from a spectrum analyzer, receiving a command from the on-boarding system to manipulate a signal strength of the device;
responsive to receiving the command, reducing a signal level of a wireless channel of the first secure session to limit an emission range of the device;
computing an owner pre-shared key (PSK) in the device in the first secure session, storing the owner PSK in a storage of the device, and thereafter terminating the first secure session;
establishing a second secure session between the on-boarding system and the device, using the owner PSK; and
responsive to successfully establishing the second secure session, autonomously self-asserting and updating an ownership state of the device to an owned state within the IoT network without reliance on the on-boarding system.

17. The method of claim 16, further comprising:
receiving a first token from the on-boarding system, the first token received in the on-boarding system from a manufacturer of the device via an out-of-band channel;
comparing the first token to a stored token stored in a secure storage of the device, the stored token stored by the manufacturer of the device; and
updating the ownership state of the device, based at least in part on the comparison.

* * * * *